Aug. 10, 1948.     H. HONIGMAN     2,446,703
VARIABLE SPEED CLUTCH PULLEY
Filed May 11, 1944     3 Sheets-Sheet 1

INVENTOR.
HANS HONIGMAN
BY Eber J. Hyde
Attorney

Aug. 10, 1948.     H. HONIGMAN     2,446,703
VARIABLE SPEED CLUTCH PULLEY
Filed May 11, 1944     3 Sheets-Sheet 2

INVENTOR.
HANS HONIGMAN
BY Eber J. Hyde
Attorney

INVENTOR.
HANS HONIGMAN
BY
Attorney

Patented Aug. 10, 1948

2,446,703

UNITED STATES PATENT OFFICE 2,446,703

VARIABLE SPEED CLUTCH PULLEY

Hans Honigman, East Cleveland, Ohio

Application May 11, 1944, Serial No. 535,163

1 Claim. (Cl. 192—104)

My invention pertains to a variable speed clutch pulley, and more particularly to a variable speed clutch pulley having a manually adjustable rate of rotation and means for automatically maintaining the selected speed.

It is an object of my invention to provide a variable speed clutch pulley wherein the selected speed is automatically maintained.

Another object of my invention is to provide a variable speed clutch pulley rotatable in a given direction, and which may operate in the reverse direction upon reversing the position of a few of its parts.

It is also an object of my invention to provide a friction clutch mechanism wherein the set frictional coupling is automatically maintained.

It is an object of my invention to automatically increase or decrease the speed of a driven member upon its speed decreasing or increasing from a desired speed.

Other objects of my invention may be had by referring to the specification and claim taken in conjunction with the drawing in which, Figure 1 is a sectional view of a device embodying my invention taken along lines 1—1 of Figure 2 and showing the clutch pulley in end view.

Figure 1:
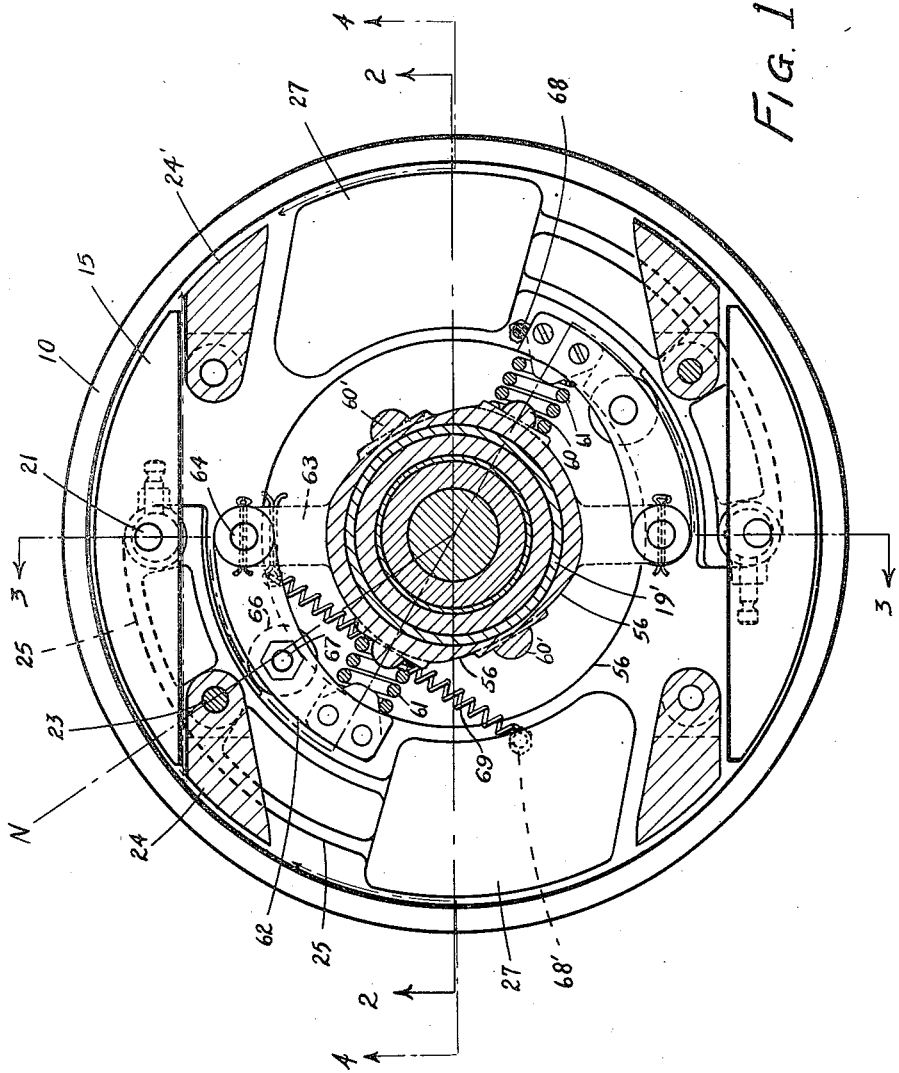
Figure 2:
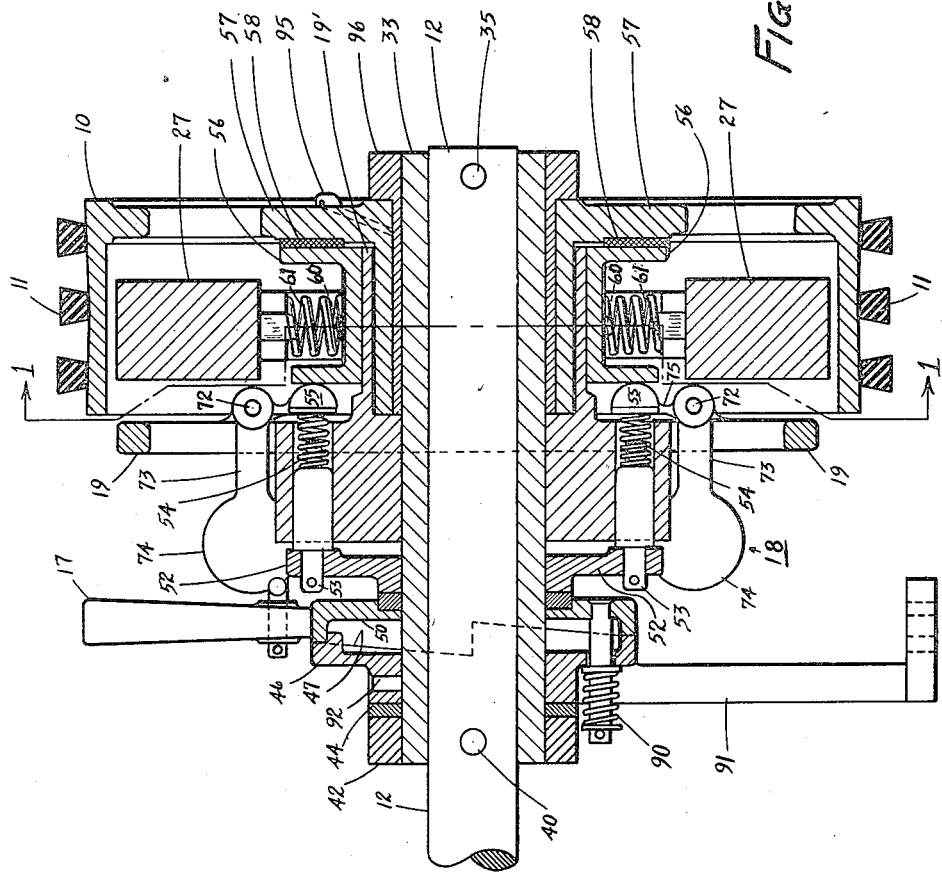
Figure 2 is a sectional view taken along lines 2—2 of Figure 1 and showing the clutch pulley in side view.
Figure 3:
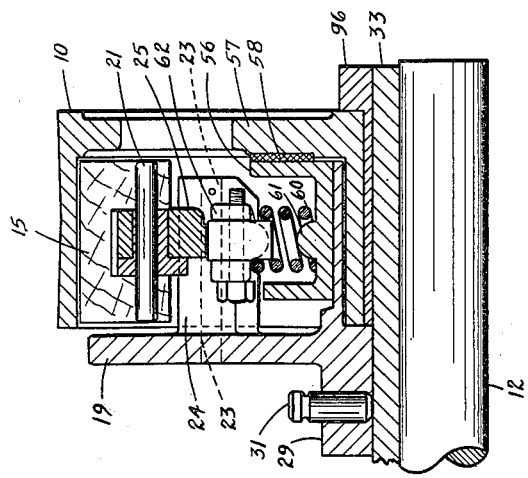
Figure 3 is a sectional view taken along lines 3—3 of Figure 1.

With reference to Figure 1, my invention comprises a loose pulley 10 which is driven, for instance, by a plurality of V belts 11 (Figure 2) and which may be termed the driving member. The loose pulley is mounted upon a shaft which is the driven member and is adapted to rotate at a different speed than the shaft. It is the function of the clutch mechanism to establish a chosen amount of frictional coupling between the driving member 10 and the driven member 12 for rotating the driven member at a selected speed, and to automatically compensate for excessive or under speed in the driven member.

The driving connection from the pulley 10 to the shaft 12 is through a pair of friction blocks 15 whose frictional engagement with the inside surface of the loose pulley 10 may be manually varied by a lever 17 and may be automatically varied by a governor system 18.

When the friction blocks 15 are held in frictional engagement with the inside surface of the pulley 10 the blocks 15 rotate as the pulley 10 rotates about the shaft 12. Each friction block 15 is pivotally connected to a spider 19 by means of a block pin 21 and a spider pin 23. Connected to each of the friction blocks 15 by means of arms and adapted to pivot about the spider pins 23 are counter weights 27 which substantially balance the frictional blocks 15 and their associated pivoting mechanism 21. As the friction blocks 15 rotate, the assembly, including the pivot pins 21 and 23 and the counter weights 27, and their supporting arms 25, are also rotated, thereby rotating the spider 19.

The spider 19 has a shoulder 29 through which extends a connecting pin 31 for attaching the spider to a sleeve bearing 33. The sleeve bearing 33 is connected to the shaft 12 by means of a set screw 35. Therefore, as the pulley 10 rotates, frictional engagement causes the friction blocks 15 to rotate, and, as the blocks 15 are connected through block pins 21 and spider pins 23 to the spider 19, and the spider is connected by means of connecting pin 31 to the sleeve bearing 33 and by means of set screws 35 to shaft 12, it causes shaft 12 to rotate.

There may be slippage between the pulley 10 and the friction blocks 15 to cause the shaft 12 to be driven at a lower rate of rotation than the pulley 10. The frictional slippage between the blocks 15 and the pulley 10 is manually adjusted by lever 17.

Figure 4:
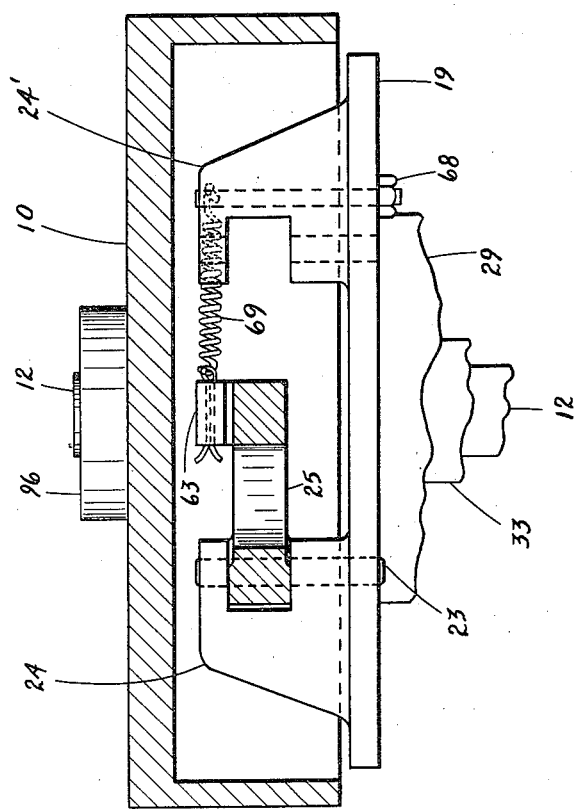
Figure 4 is a sectional view (with detail omitted) taken along line 4—4 of Figure 1.

Connected to the shaft 12 by means of a set screw 40 is a collar 42 which therefore rotates as the shaft 12 and sleeve bearing 33 rotate. A bearing 44 is provided, one face of which engages the collar 42 and the other face of which engages a fixed ring 46 which has a tapering face 47 and which is held against rotation by means of the arm 91 which is adapted to be bolted to a fixed external support. The lever ring 50 has a face which bears against the tapering face 47 of the fixed ring 46 and, as the lever 17 is moved in one direction, it causes the lever ring 50 to move axially with respect to the shaft 12. This axial movement pushes the intermediate ring 52 axially along the shaft 12 and by means of pin 53 compresses the spring 54. This causes the bearing member 55 to be forced against one face of an annular ring member 56 which ring member may be substantially U shape in half cross-section. This forces the other face of the annular ring member 56 against one face of a clutch plate 58, and the opposite face of the clutch plate 58 is forced against the flange portion 57 of the loose pulley 10. Due to the rotation of the loose pulley 10 and the frictional forces transmitted through the clutch plate 58, the annular ring will shift its position slightly against the pull of a spring 69, one end of which is connected to the annular ring member 56 and the other end of which is anchored to the spider 19 as is particularly shown in Figure 4. The more the lever 17 is thrown, the greater will be the pressure applied through the clutch plate 58 and the more the annular ring member 56 will shift its position with respect to the spider 19. The shifting of the annular ring member 56 with respect to the spider causes the frictional engagement between the block 15 and the pulley 10 to be altered in the following manner.

Integral with the base portion of the U-shaped annular ring member 56 at two places is a raised spring retaining member 60 about which are positioned relatively strong springs 61. Each spring 61 exerts force against an arm 62 which is pivoted from the annular member 56 by means of the upstanding lug 63 and a pivot pin 64. Pivotally connected to the arm 62 is a rotatable wheel 66 which engages and rolls upon a bearing surface on the arm 25. The wheel 66 rotates about an axle 67 and when the center of the axle 67 is positioned to the counterweight side of a neutral axis N extending between the center of shaft 12 and the center of the spider pin 23, the force of the springs 61 prevent the friction blocks 15 from engaging the pulley 10, as is particularly shown in Figure 1. However, when the lever 17 is thrown to cause the bearing members 55 to push the annular ring member 56 against the clutch plate 58 and the flange portion 57 of the pulley 10 to shift the position of the annular ring member 56 a slight amount, it causes (through lug 63, a pivot pin 64, and the arm 62) the wheel 66 to move over the neutral axis N extending between the center point of the shaft 12 and the center of the spider pin 23. Movement of the wheel 66 to the opposite side of this neutral axis N applies the bias of spring 61 to a varying degree (depending upon the amount of the shift of the annular ring 56) through the arm 62, the wheel 66, the arm 25, and the block pin 21 to the friction block, thereby causing the friction block to move into engagement with the pulley 10. The more the bearing member 55 is pushed against the annular ring member 56, the more the ring member 56 shifts and the greater the leverage applied to the block pin 21 to increase the force with which the friction block 15 is pushed against the pulley 10, thereby increasing the friction of the coupling between the pulley 10 and the shaft 12.

When the lever 17 is moved in the reversed direction to reduce the frictional coupling between the pulley 10 and the friction block 15, the spring 69 contracts as the wheel 66 moves over the neutral axis N in a direction toward the counterweight 27. Frictional force between the lever ring 50 and the fixed ring 46 maintains lever 17 in any chosen position.

It has been found that in prior art devices mechanisms of the aforementioned type will not maintain a constant frictional coupling between the pulley 10 and the shaft 12 such that the shaft 12 is driven at a constant rate of speed after the lever 17 has been manually set to produce a given rotational speed of the shaft 12. It has been found that the shaft 12 is apt to increase or decrease its rate of speed after the lever 17 has been set. I provide automatic governor means indicated generally by the reference character 18 for preventing the shaft 12 from running at a rate of rotation faster or slower than that set by the lever 17.

Connected to the rotating spider 19 is a governor shaft pivot pin 72 about which a governor arm 73 is adapted to rotate, and connected to the arm 73 is a mass 74 such as a governor ball. At right angles to the governor arm 73 and connected to it is an arm 75. The bearing member 55 which engages the annular ring member 56 is mounted on this arm 75. Once the lever 17 is fixed for a certain rate of rotation of the shaft 12, thereby applying a certain amount of pressure through the spring 54 to the clutch plate 58, the shaft 12 will rotate at that certain set rate of speed and the mass 74, which is mounted on the pivot pin 72, will seek a certain position under the influence of centrifugal force. If, however, due to changing heat conditions between pulley 10 and the friction block 15 or other variable conditions such as the load which are apt to exist, the shaft 12 seeks to run faster than its allotted speed, then the spider 19 will also run too fast and the governor mechanism 18, which is mounted on the spider 19, will also rotate too fast. By centrifugal force this will cause the masses 74 to move outwardly about their pivot pins 72, thereby causing the arms 75 to pivot and force each of the bearing members 55 against its spring 54. This compresses the springs 54 slightly, relieving the force with which the bearing member 55 is pressed against the annular ring member 56, thereby relieving the coupling between the clutch plate 58 and allowing the annular ring member 56 to move its position with respect to the pulley 10. This means that the wheel 66 approaches the neutral axis N in a direction toward the counterweight 27 thereby relieving the bias exerted by spring 61 on the friction block 15 which reduces the coupling between the block 15 and the pulley 10 and permitting the rate of rotation of shaft 12 to be reduced by the load which is on it.

When the driven member 12 runs slower than the rate set by the lever 17 the springs 54 overcome the centrifugal force exerted by the governor masses and press harder against the U-shaped annular ring member, thereby, through clutch plate 58, increasing the frictional coupling between the loose pulley 10 and the friction blocks 15. This will increase the rate of rotation of the friction blocks and consequently the rate of rotation of the driven member.

Once the position of lever 17 is set, the governor mechanism 18 will automatically act to maintain a relatively constant rate of rotation of the shaft 12.

The variable speed clutch pulley which I have described is essentially a one direction drive. However, it is possible to remove some of the parts of the pulley and reassemble in a reverse position for causing the device to run in a reverse direction. For this purpose I have provided four connecting lugs 24 and 24' integral with the spider 19 and which are bored to accommodate the spider pins 23. Two of the lugs 24, 24 are used when the pulley is assembled to rotate in one direction, and the other two of the lugs 24', 24' are used when the pulley is assembled to rotate in the reverse direction. I have also provided two means 68 and 68' for connecting the end of the spring 69 to the pulley 10, and the annular ring member 56 has been provided with extra spring retaining members 60' for use when the pulley is assembled to run in the reverse direction. All that is necessary for reversing the direction of my variable speed clutch pulley is that the spring members 61, the arm 62 with its wheel 66, and the arm 25 with its associated counterweight 27, and pivot pins 21 and 23 be reversed into their alternate positions, and that the spring 69 be placed in its alternate position with its fixed end connected at 68'.

The fixed ring 46 is connected to any fixed base by means of the arm 91 and a spring 90 is provided for assuring that the lever ring 50 has one face at all times pressed against the tapering face 47 of the fixed ring 46. An oil hole 92 may be provided for applying lubrication between sleeve bearing 33 and the fixed ring 46 and an oil hole 95 may be provided for applying lubrication between the pulley 10 and the sleeve 96. Obviously, other oil holes may be provided where needed.

While I have described my invention with a certain degree of particularity, it is to be understood that many other embodiments and arrangements of parts may be utilized without departing from the spirit and scope of my invention.

I claim as my invention:

In a variable speed pulley having a driving member and a driven member and friction means connected to said driven member and adapted under the pressure of manually operated means to variably frictionally couple the driving member to the driven member, the improvement which comprises, a spider connected to said driven member, a counter-weight connected to said friction means to form a pivotal assembly, means pivotally connecting said pivotal assembly to said spider, a pressure roller movably mounted in engagement with said pivotal assembly near the said pivot point, said pressure roller upon motion from said pivot point toward said counter-weight reducing the pressure between said driving member and said friction means and upon motion from said pivot point toward said friction means increasing the pressure between said driving member and said friction means; rotatably mounted governor means driven by said driven member, and means for permitting said governor means to rotate at a different rate of speed than said driving member, said governor means upon being driven at an excessive rate of rotation by said driven member automatically acting to shift the location of said pressure roller with respect to said pivot point to vary the frictional coupling between said friction means and said driving member thereby altering the speed of said driven member.

HANS HONIGMAN.

REFERENCES CITED

The following references are of record in the file of this patent:

UNITED STATES PATENTS

| Number | Name | Date |
|---|---|---|
| 1,555,370 | Heidegger | Sept. 29, 1925 |
| 2,306,158 | Ferguson | Dec. 22, 1942 |

FOREIGN PATENTS

| Number | Country | Date |
|---|---|---|
| 364,463 | France | Aug. 23, 1906 |